(12) United States Patent
Xieh

(10) Patent No.: US 6,978,550 B2
(45) Date of Patent: Dec. 27, 2005

(54) PROTRACTOR AND RULER COMBINATION

(76) Inventor: Kun-Li Xieh, 132, Ziqiang Rd., Zhungmin Cun, Baozhung Hsiang, Yunlin Hsien (TW)

( * ) Notice: Subject to any disclaimer, the term of this patent is extended or adjusted under 35 U.S.C. 154(b) by 0 days.

(21) Appl. No.: 10/763,153

(22) Filed: Jan. 21, 2004

(65) Prior Publication Data
US 2005/0155234 A1   Jul. 21, 2005

(51) Int. Cl.[7] .............................................. B43L 9/02
(52) U.S. Cl. ......................... 33/27.02; 33/465; 33/471
(58) Field of Search ......................... 33/27.03, 424, 33/425, 426, 484, 534, 465, 471, 42, 452, 33/489, 456, 27.02, 27.031, 27.032, 27.033, 33/558.01, 558.02, 558.03, 558.04, 558.05, 33/558.06, 558.07, 558.08, 558.09, 558.1

(56) References Cited

U.S. PATENT DOCUMENTS

| | | | | |
|---|---|---|---|---|
| 175,416 A | * | 3/1876 | Bustin | 33/424 |
| 475,390 A | * | 5/1892 | Downey | 33/500 |
| 761,272 A | * | 5/1904 | Wagniere | 33/465 |
| 876,042 A | * | 1/1908 | Darr | 33/497 |
| 912,605 A | * | 2/1909 | Osmonson | 33/456 |
| 1,299,978 A | * | 4/1919 | MacDowney | 33/471 |
| 1,351,527 A | * | 8/1920 | Lopez | 33/499 |
| 1,414,033 A | * | 4/1922 | Mahon | 33/471 |
| 1,632,267 A | * | 6/1927 | Beem | 33/473 |
| 2,353,989 A | * | 7/1944 | Beaucage | 33/425 |
| 2,504,244 A | * | 4/1950 | Barclay | 33/419 |
| 2,517,264 A | * | 8/1950 | Wake | 33/419 |
| 3,096,586 A | * | 7/1963 | Albright et al. | 33/26 |
| 4,535,542 A | * | 8/1985 | Liu et al. | 33/534 |
| 4,539,881 A | * | 9/1985 | Maier | 83/745 |
| 4,562,649 A | * | 1/1986 | Ciavarella | 33/419 |
| 5,392,525 A | * | 2/1995 | Chow | 33/465 |
| 5,419,053 A | * | 5/1995 | Kathan | 33/417 |
| 5,471,755 A | * | 12/1995 | Haskell | 33/485 |
| 5,475,931 A | * | 12/1995 | Wei | 33/471 |
| 5,539,991 A | * | 7/1996 | Harrison | 33/471 |
| 6,141,882 A | * | 11/2000 | Syken | 33/471 |
| 6,237,238 B1 | * | 5/2001 | Shapiro | 33/471 |
| 6,536,124 B1 | * | 3/2003 | Eskew et al. | 333/471 |
| 6,694,633 B1 | * | 2/2004 | Nyquist | 33/452 |

* cited by examiner

*Primary Examiner*—G. Bradley Bennett
*Assistant Examiner*—Amy R. Cohen
(74) *Attorney, Agent, or Firm*—Alan D. Kamrath; Nikolai & Mersereau, P.A.

(57) ABSTRACT

A protractor and ruler combination includes a main ruler having a side formed with a protractor, a secondary ruler rotatably mounted on the main ruler, and an auxiliary ruler having a side secured on the secondary ruler, so that the secondary ruler is moved in concert with the auxiliary ruler on the protractor of the main ruler. Thus, the auxiliary ruler is moved relative to the main ruler, and the secondary ruler is moved in concert with the auxiliary ruler on the protractor of the main ruler, so that the included angle between the ruler section of the main ruler and the ruler section of the auxiliary ruler is measured exactly.

9 Claims, 7 Drawing Sheets

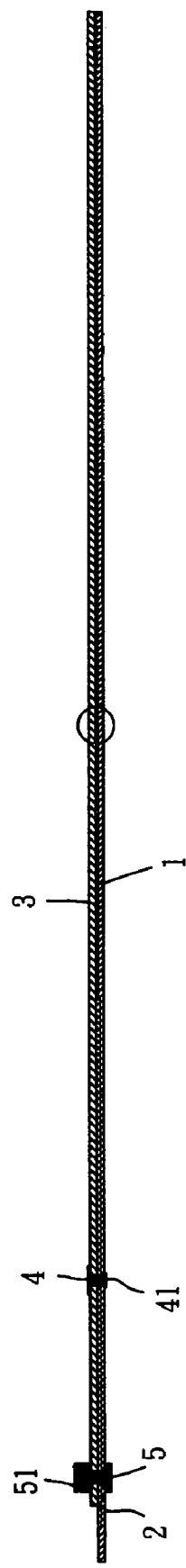
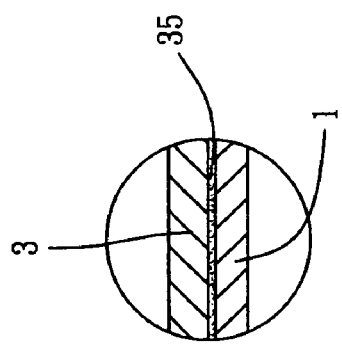
FIG. 3
FIG. 4

PROTRACTOR AND RULER COMBINATION

BACKGROUND OF THE INVENTION

1. Field of the Invention

The present invention relates to a protractor and ruler combination and, more particularly, to a protractor and ruler combination, wherein the included angle between the ruler section of the main ruler and the ruler section of the auxiliary ruler is measured exactly.

2. Description of the Related Art

A conventional protractor and ruler combination 10 in accordance with the prior art shown in FIGS. 7–9 comprises a ruler 20 having a first side formed with a plurality of scales 201 and a second side 202 formed with a contrast portion 203 having a reading scale 204, a protractor 30 rotatably mounted on the ruler 20 and having a plurality of scales 301, a threaded rod 302 mounted on the protractor 30 and extended through the ruler 20, a washer 303 mounted on the threaded rod 302, and a nut 304 screwed on the threaded rod 302. In practice, the ruler 20 is rotated relative to the protractor 30 as shown in FIG. 9, so that the user can identify the included angle between the ruler 20 and the protractor 30 by matching the reading scale 204 of the contrast portion 203 with one of the scales 301 of the protractor 30.

However, the user cannot identify the included angle between the ruler 20 and the protractor 30 exactly. In addition, the ruler 20 rubs the protractor 30 frequently, so that the scales 301 of the protractor 30 are easily worn out due to frequent friction and contact, thereby causing inconvenience to the user in identification and measurement of the included angle between the ruler 20 and the protractor 30.

SUMMARY OF THE INVENTION

The primary objective of the present invention is to provide a protractor and ruler combination, wherein the auxiliary ruler is moved relative to the main ruler, and the secondary ruler is moved in concert with the auxiliary ruler on the protractor of the main ruler, so that the included angle between the ruler section of the main ruler and the ruler section of the auxiliary ruler is measured exactly.

Another objective of the present invention is to provide a protractor and ruler combination, wherein the auxiliary ruler and the secondary ruler are moved on the protractor of the main ruler by guidance of the guide slot of the protractor, so that the auxiliary ruler and the secondary ruler are moved rigidly and stably, thereby facilitating the user operating the protractor and ruler combination.

A further objective of the present invention is to provide a protractor and ruler combination, wherein the anti-skid pad is moved with the ruler section of the auxiliary ruler on the surface of the article to provide an anti-skid effect and to prevent the auxiliary ruler from scratching the surface of the article.

A further objective of the present invention is to provide a protractor and ruler combination, wherein the anti-skid pad separates the auxiliary ruler from the surface of the article, thereby preventing the ink of a pen from infiltrating into the surface of the article from the auxiliary ruler.

A further objective of the present invention is to provide a protractor and ruler combination, wherein the anti-skid pad separates the ruler section of the auxiliary ruler from the ruler section of the main ruler, thereby preventing the auxiliary ruler and the main ruler from being worn out due to frequent friction and contact.

A further objective of the present invention is to provide a protractor and ruler combination, wherein the support member is rested on the surface of the article, thereby facilitating the user moving the auxiliary ruler on the surface of the article.

In accordance with the present invention, there is provided a protractor and ruler combination, comprising a main ruler, a secondary ruler, and an auxiliary ruler, wherein:

the main ruler has a first side formed with a protractor having a plurality of scales;

the secondary ruler is rotatably mounted on the main ruler and has a plurality of reading scales; and the auxiliary ruler has a first side secured on the secondary ruler, so that the secondary ruler is moved in concert with the auxiliary ruler on the protractor of the main ruler.

Further benefits and advantages of the present invention will become apparent after a careful reading of the detailed description with appropriate reference to the accompanying drawings.

BRIEF DESCRIPTION OF THE DRAWINGS

FIG. 3 is a plan cross-sectional view of the protractor and ruler combination as shown in FIG. 1;

FIG. 4 is a partially cut-away enlarged view of the protractor and ruler combination as shown in FIG. 3;

DETAILED DESCRIPTION OF THE INVENTION

Figure 1:
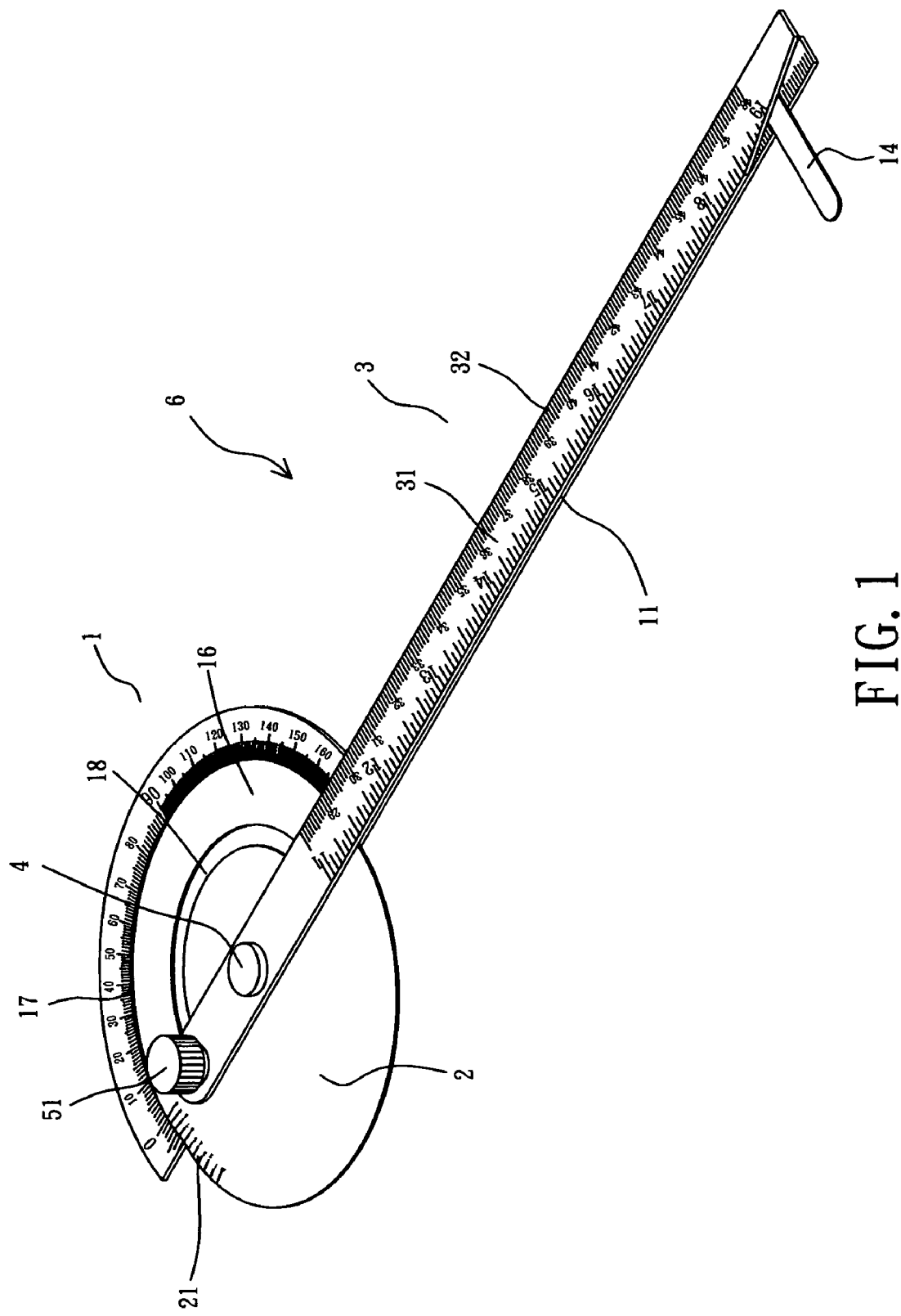
FIG. 1 is a perspective view of a protractor and ruler combination in accordance with the preferred embodiment of the present invention.
Figure 2:
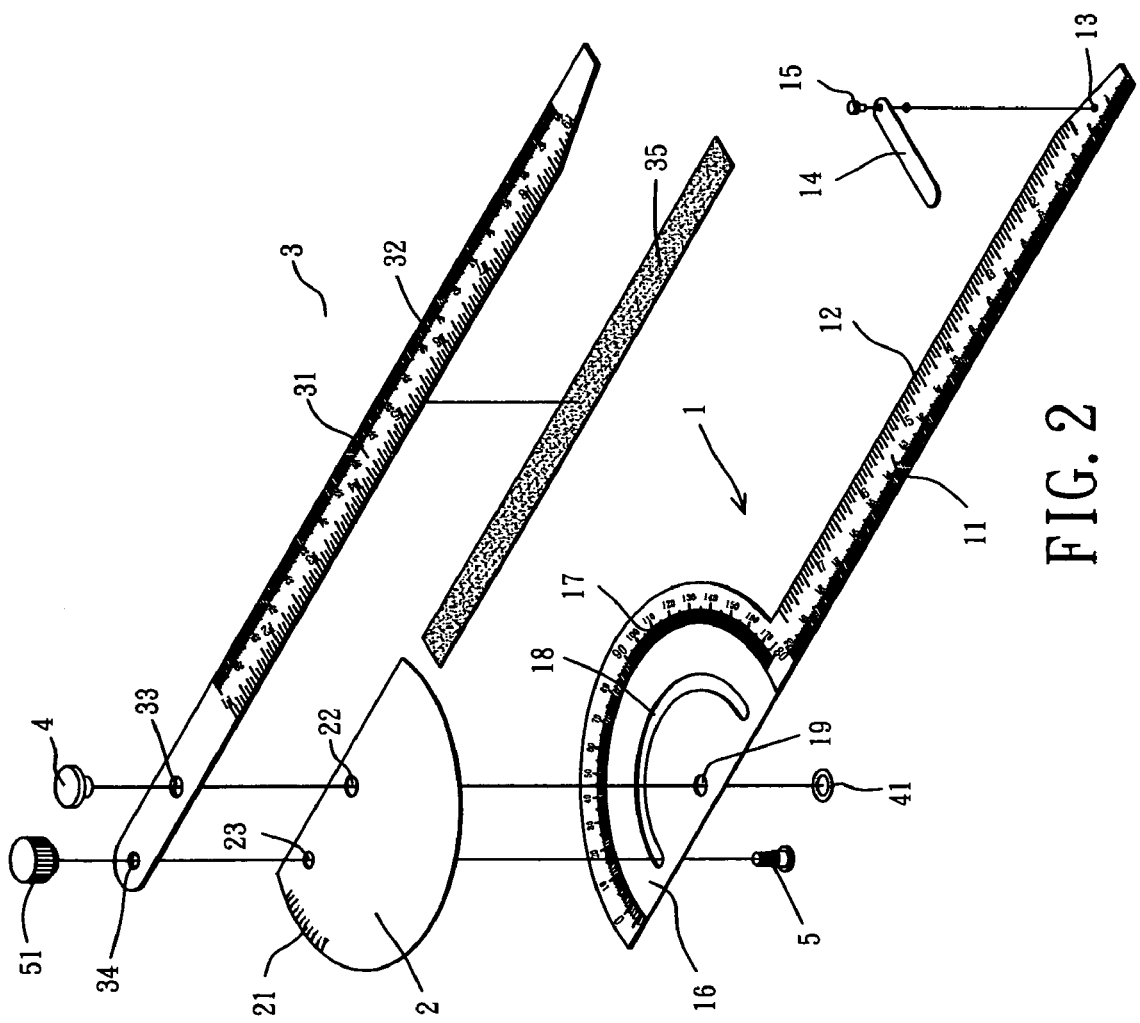
FIG. 2 is an exploded perspective view of the protractor and ruler combination as shown in FIG. 1.

Referring to the drawings and initially to FIGS. 1–4, a protractor and ruler combination 6 in accordance with the preferred embodiment of the present invention comprises a main ruler 1, a secondary ruler 2, and an auxiliary ruler 3.

The main ruler 1 has a first side connected to a second side. The first side is formed with a protractor 16 having a plurality of scales 17. The second side is formed with a ruler section 11 having a plurality of scales 12.

The ruler section 11 of the main ruler 1 has a distal end formed with a fixing hole 13. The, protractor and ruler combination 6 further comprises a support member 14 pivotally mounted on the ruler section 11 of the main ruler 1, and a pivot shaft 15 extended through an end of the support member 14 and fixed in the fixing hole 13 of the ruler section 11.

The protractor 16 of the main ruler 1 has a center formed with a through hole 19 and has a periphery formed with an arc-shaped guide slot 18.

The secondary ruler 2 having a semi-circular shape is rotatably mounted on the main ruler 1 and has a plurality of reading scales 21.

The sizes of the reading scales 21 of the secondary ruler 2 are determined according to an inner diameter of the scales 17 of the protractor 16.

The secondary ruler 2 has a center formed with a through hole 22 aligning with the through hole 19 of the protractor 16 and has a periphery formed with a through bore 23 aligning with the guide slot 18 of the protractor 16.

The auxiliary ruler 3 has a first side connected with a second side. The first side is formed with a through hole 33 aligning with the through hole 22 of the secondary ruler 2 and a through bore 34 aligning with the through bore 23 of the secondary ruler 2. The second side is formed with a ruler section 31 having a plurality of scales 32.

The protractor and ruler combination 6 further comprises an anti-skid pad 35 mounted on the ruler section 31 of the auxiliary ruler 3 and located beside the secondary ruler 2.

The protractor and ruler combination 6 further comprises a pivot pin 4 extended through the through hole 33 of the auxiliary ruler 3, the through hole 22 of the secondary ruler 2 and the through hole 19 of the protractor 16, and a snap member 41 secured on a distal end of the pivot pin 4. The protractor and ruler combination 6 further comprises a screw member 5 extended through the guide slot 18 of the protractor 16, the through bore 23 of the secondary ruler 2 and the through bore 34 of the auxiliary ruler 3, and a nut 51 screwed on the screw member 5. In such a manner, the secondary ruler 2 is moved in concert with the auxiliary ruler 3 on the protractor 16 of the main ruler 1.

Figure 5:
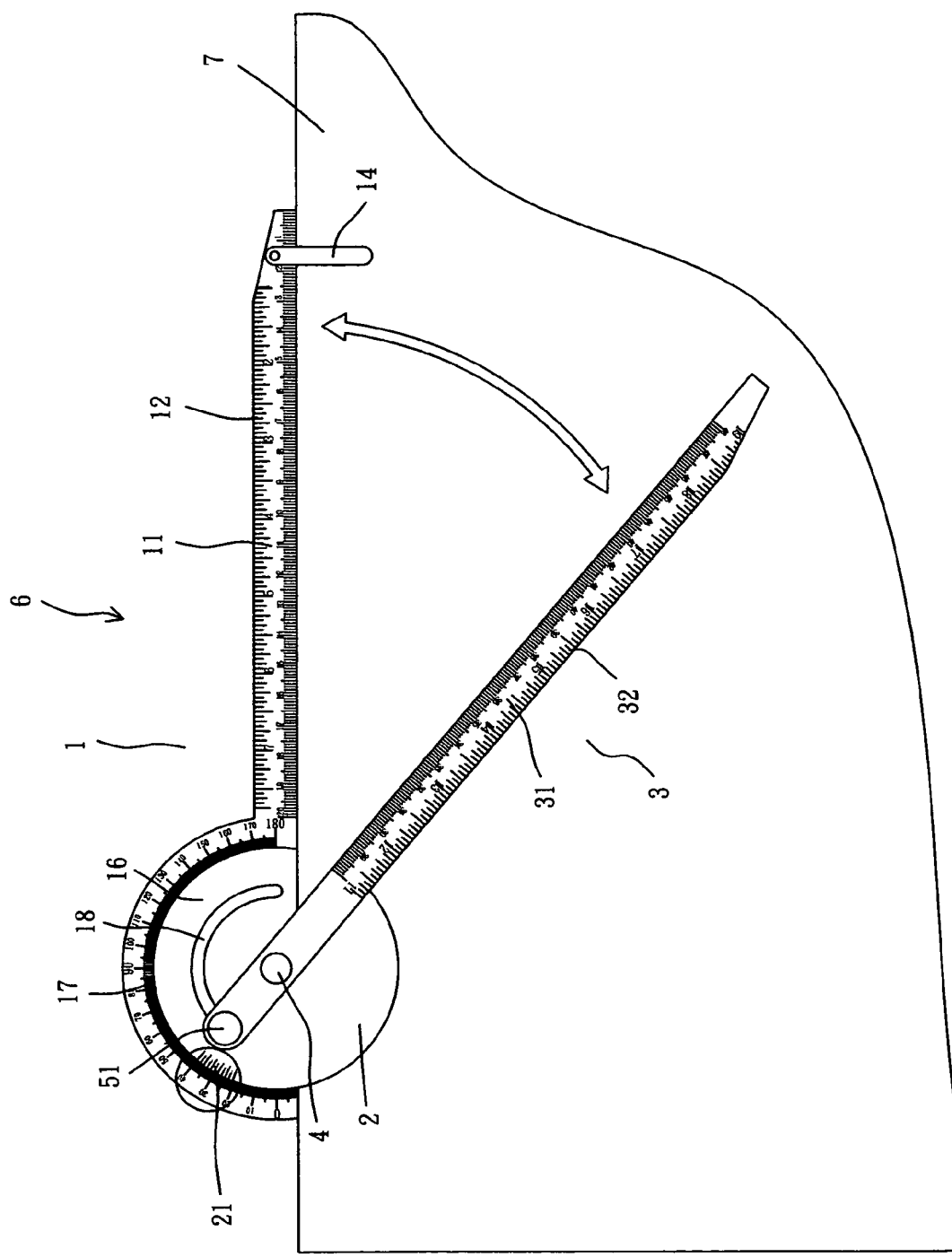
FIG. 5 is a top plan operational view of the protractor and ruler combination as shown in FIG. 1.

In practice, referring to FIGS. 1–6, the ruler section 11 of the main ruler 1 is rested on an edge of an article 7, and the support member 14 is pivoted on the ruler section 11 of the main ruler 1 and rested on a surface of the article 7. Then, the auxiliary ruler 3 is moved outward relative to the main ruler 1 to the position as shown in FIG. 5, and the secondary ruler 2 is moved in concert with the auxiliary ruler 3 on the protractor 16 of the main ruler 1, so that the reading scales 21 of the secondary ruler 2 are moved relative to the scales 17 of the protractor 16.

When either one of the reading scales 21 of the secondary ruler 2 is in alignment with a respective one of the scales 17 of the protractor 16, the respective scale 17 of the protractor 16 indicates the exact angular value between the ruler section 11 of the main ruler 1 and the ruler section 31 of the auxiliary ruler 3 as shown in FIG. 5. For example, as shown in FIG. 6, when the value "0" of the reading scales 21 of the secondary ruler 2 is in alignment with the respective value "40" of the scales 17 of the protractor 16, the included angle between the ruler section 11 of the main ruler 1 and the ruler section 31 of the auxiliary ruler 3 as shown in FIG. 5 is read as 40 degrees.

Figure 6A:
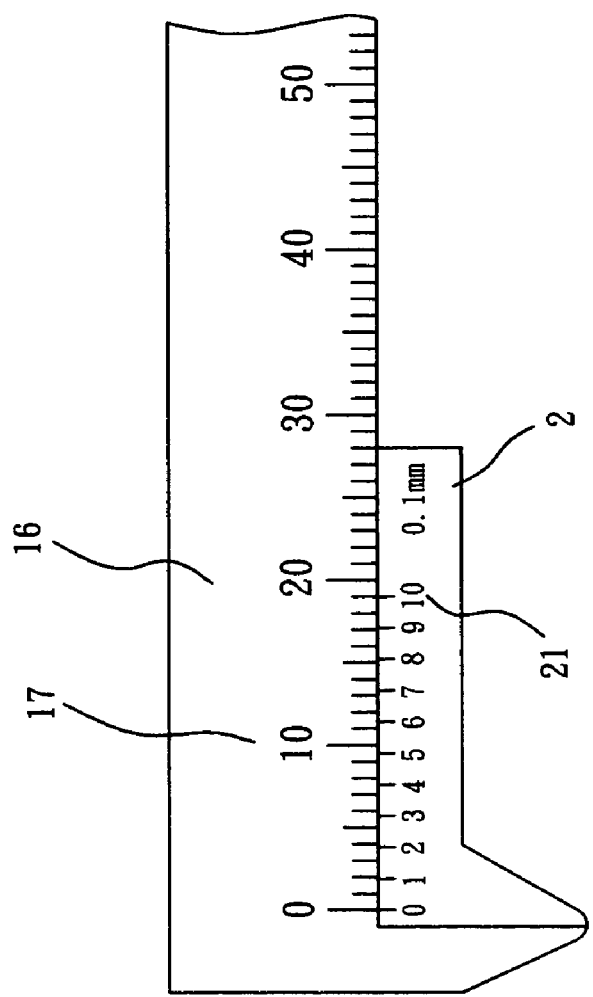
FIG. 6A is a partially plan expansion view of the protractor and ruler combination as shown in FIG. 6.
Figure 6:
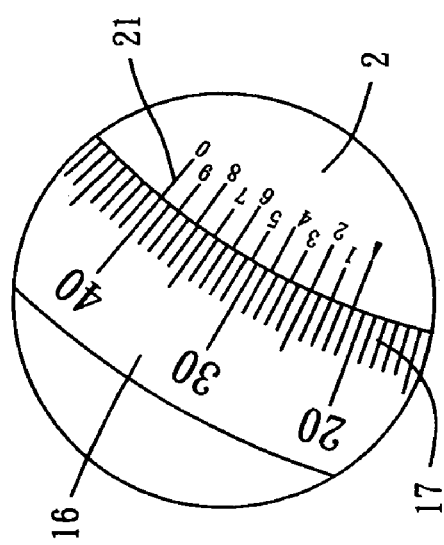
FIG. 6 is a partially cut-away enlarged view of the protractor and ruler combination as shown in FIG. 5.
Figure 8:
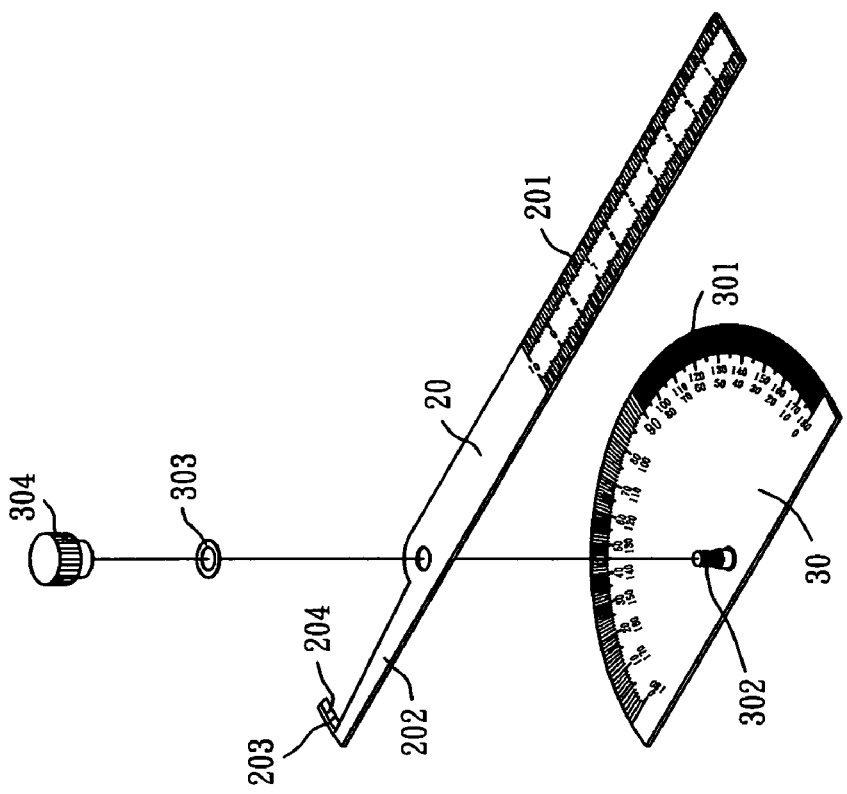
FIG. 8 is an exploded perspective view of the conventional protractor and ruler combination as shown in FIG. 7.
Figure 7:
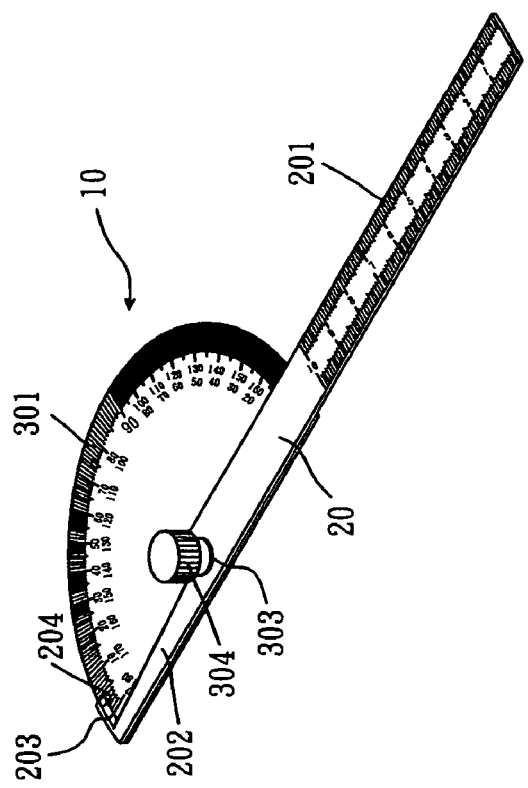
FIG. 7 is a perspective view of a conventional protractor and ruler combination in accordance with the prior art.
Figure 9:
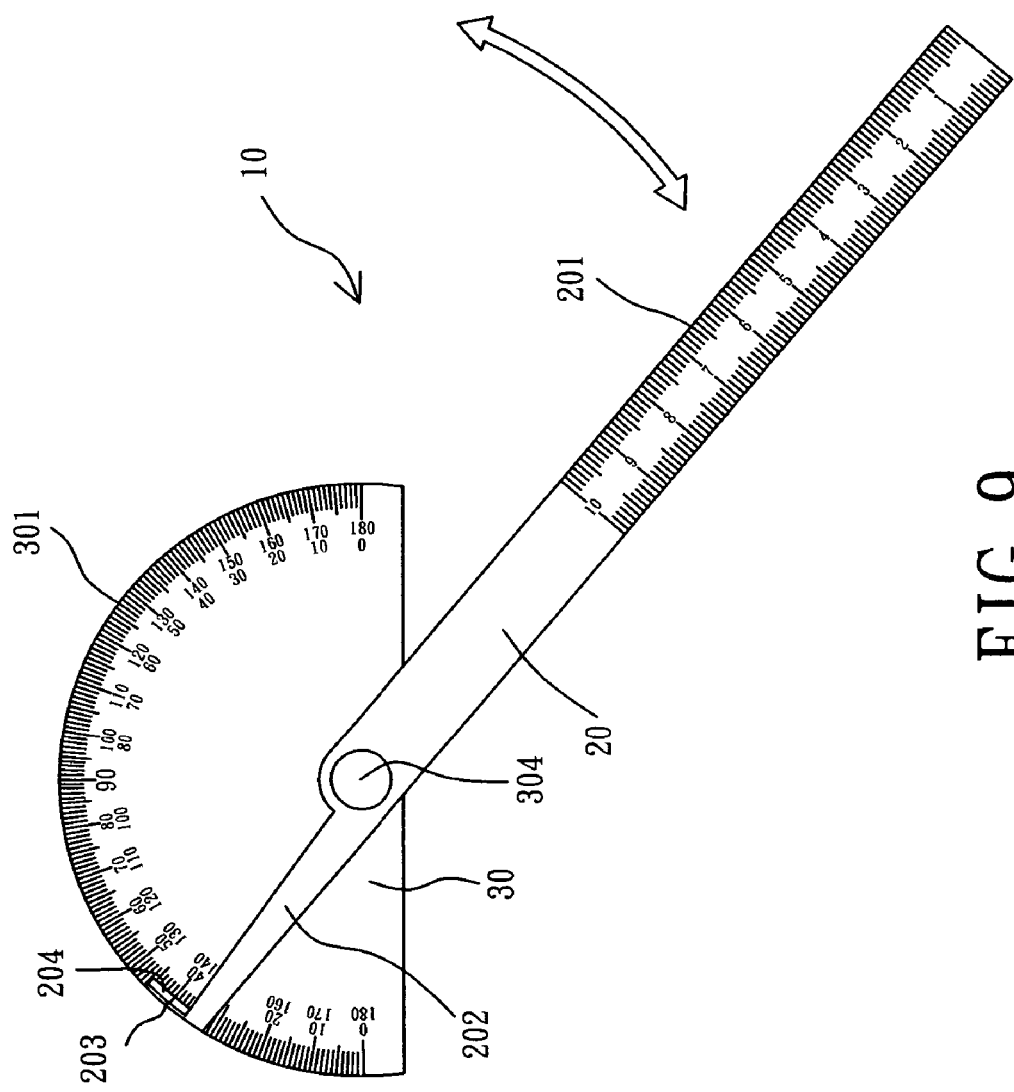
FIG. 9 is a top plan operational view of the conventional protractor and ruler combination as shown in FIG. 7.

Referring to FIG. 6A, ten intervals of the reading scales 21 of the secondary ruler 2 are corresponding to nineteen intervals (19 mm) of the scales 17 of the protractor 16, so that each interval of the reading scales 21 of the secondary ruler 2 is equal to 1.9 mm. In addition, every ten intervals of the reading scales 21 of the secondary ruler 2 are spaced from every ten intervals of the scales 17 of the protractor 16 by 1.0 mm, so that each interval of the reading scales 21 of the secondary ruler 2 is spaced from each interval of the scales 17 of the protractor 16 by 0.1 mm. Thus, the included angle between the ruler section 11 of the main ruler 1 and the ruler section 31 of the auxiliary ruler 3 is exactly measured to reach the precision of 0.1 mm.

Accordingly, the auxiliary ruler 3 is moved relative to the main ruler 1, and the secondary ruler 2 is moved in concert with the auxiliary ruler 3 on the protractor 16 of the main ruler 1, so that the included angle between the ruler section 11 of the main ruler 1 and the ruler section 31 of the auxiliary ruler 3 is measured exactly. In addition, the auxiliary ruler 3 and the secondary ruler 2 are moved on the protractor 16 of the main ruler 1 by guidance of the guide slot 18 of the protractor 16, so that the auxiliary ruler 3 and the secondary ruler 2 are moved rigidly and stably, thereby facilitating the user operating the protractor and ruler combination 6. Further, the anti-skid pad 35 is moved with the ruler section 31 of the auxiliary ruler 3 on the surface of the article 7 to provide an anti-skid effect and to prevent the auxiliary ruler 3 from scratching the surface of the article 7. Further, the anti-skid pad 35 separates the auxiliary ruler 3 from the surface of the article 7, thereby preventing the ink of a pen from infiltrating into the surface of the article 7 from the auxiliary ruler 3. Further, the anti-skid pad 35 separates the ruler section 31 of the auxiliary ruler 3 from the ruler section 11 of the main ruler 1, thereby preventing the auxiliary ruler 3 and the main ruler 1 from being worn out due to frequent friction and contact. Further, the support member 14 is rested on the surface of the article 7, thereby facilitating the user moving the auxiliary ruler 3 on the surface of the article 7.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A protractor and ruler combination, comprising a main ruler, a secondary ruler, and an auxiliary ruler, wherein:
    the main ruler has a first side integrally formed with a protractor having a plurality of scales, with the protractor having a semi-circular shape and a center;
    the secondary ruler is separately formed from the main ruler, wherein the secondary ruler has a semi-circular shape and a center, wherein the secondary ruler has a plurality of reading scales; and
    the auxiliary ruler is separately formed from the main ruler and the secondary ruler, wherein the auxiliary ruler has a center, with the main ruler, the secondary ruler and the auxiliary ruler rotatably mounted about the centers of the protractor, the secondary ruler, and the auxiliary ruler with the secondary ruler sandwiched between the main ruler and the auxiliary ruler, with the auxiliary ruler being removably secured to the secondary ruler so that the secondary ruler is moved in concert with the auxiliary ruler on the protractor of the main ruler.

2. The protractor and ruler combination in accordance with claim 1, wherein the main ruler has a ruler section having a plurality of scales formed on a first face.

3. The protractor and ruler combination in accordance with claim 2, wherein the ruler section of the main ruler has a distal end formed with a fixing hole, with the ruler section having a second face opposite to the first face, with the first face intermediate the second face and the auxiliary ruler, and the protractor and ruler combination further comprises a flattened support member pivotally mounted on the first face of the ruler section of the main ruler, and a pivot shaft extended through an end of the support member and fixed in the fixing hole of the ruler section, with the support member having a thickness generally equal to the thickness of the secondary ruler.

4. The protractor and ruler combination in accordance with claim 1, wherein the center of the protractor of the main ruler is formed with a through hole, wherein the protractor has a periphery formed with a semi-circular guide slot, wherein the center of the secondary ruler is formed with a through hole aligning with the through hole of the protractor, wherein the secondary ruler has a periphery formed with a through bore aligning with the guide slot of the protractor, wherein the center of the auxiliary ruler is formed with a through hole aligning with the through hole of the secondary ruler and the main ruler, wherein the auxiliary ruler has a through bore aligning with the through bore of the secondary ruler, and the protractor and ruler combination further comprises a pivot pin extended through the through hole of the auxiliary ruler, the through hole of the secondary ruler and the through hole of the protractor, and a snap member secured on a distal end of the pivot pin.

5. The protractor and ruler combination in accordance with claim 4, further comprising a screw member extended through the guide slot of the protractor, the through bore of the secondary ruler and the through bore of the auxiliary ruler, and a nut screwed on the screw member and rested on the first side of the auxiliary ruler.

6. The protractor and ruler combination in accordance with claim 1, wherein the auxiliary ruler has a ruler section having a plurality of scales.

7. The protractor and ruler combination in accordance with claim 1, further comprising an anti-skid pad mounted on a face of the auxiliary ruler, with the anti-slid pad located between the main ruler and the auxiliary ruler, with the anti-skid pad having a thickness generally equal to the secondary ruler and located radially outwardly thereof, with the anti-skid pad being positionable to separate the main ruler from the auxiliary ruler.

8. The protractor and ruler combination in accordance with claim 1, wherein the reading scales of the secondary ruler have sizes determined according to an inner diameter of the scales of the protractor, and the secondary ruler has a periphery located inside of the scales of the protractor.

9. The protractor and ruler combination in accordance with claim 8, wherein the main ruler has a ruler section, and wherein the periphery of the secondary ruler and the inner diameter of the scales of the protractor form a circle when the auxiliary ruler overlies the ruler section of the main ruler.

* * * * *